United States Patent [19]

Stolz

[11] Patent Number: 4,522,329
[45] Date of Patent: Jun. 11, 1985

[54] APPARATUS FOR PRESSING-IN BELT CONNECTORS

[75] Inventor: Hermann Stolz, Mühlheim, Fed. Rep. of Germany

[73] Assignee: Mato Maschinen-und Metallwarenfabrik Curt Matthaei GmbH & Co KG, Offenbach, Fed. Rep. of Germany

[21] Appl. No.: 375,814

[22] Filed: May 7, 1982

[30] Foreign Application Priority Data

Jun. 6, 1981 [DE] Fed. Rep. of Germany ....... 3122592

[51] Int. Cl.$^3$ .......................... B25C 7/00; B23P 11/00
[52] U.S. Cl. ................................. 227/153; 29/243.51; 227/155
[58] Field of Search ............. 29/243.56, 243.51, 243.5, 29/283, 243.1; 227/155, 143, 144, 153

[56] References Cited

U.S. PATENT DOCUMENTS

| 292,518 | 1/1884 | Sweet, Jr. | 227/144 X |
| 715,032 | 12/1902 | Davis | 227/144 X |
| 1,593,572 | 7/1926 | Diamond | 29/243.51 |
| 2,923,939 | 2/1960 | Potter | 29/243.51 |
| 3,458,099 | 7/1969 | Schick | 227/155 X |
| 4,050,138 | 9/1977 | Stolz | 227/155 X |

FOREIGN PATENT DOCUMENTS

| 1035420 | 7/1958 | Fed. Rep. of Germany . |
| 1045191 | 11/1958 | Fed. Rep. of Germany ... 29/243.51 |
| 1042988 | 9/1961 | Fed. Rep. of Germany . |
| 1206229 | 12/1965 | Fed. Rep. of Germany . |
| 2545401 | 5/1977 | Fed. Rep. of Germany . |
| 2545403 | 3/1978 | Fed. Rep. of Germany . |
| 991654 | 10/1951 | France . |
| 776811 | 6/1957 | United Kingdom . |
| 850665 | 10/1960 | United Kingdom . |
| 956170 | 4/1964 | United Kingdom ............. 29/243.51 |

Primary Examiner—Paul A. Bell
Attorney, Agent, or Firm—W. G. Fasse; D. H. Kane, Jr.

[57] ABSTRACT

The invention relates to an apparatus for pressing-in belt connectors, the pressing-in lever of which is driven by two elbow lever systems. In such a pressing-in apparatus a control lever (5) is positioned between the two elbow lever systems. The control lever is driven by the driving elbow lever pair during the first phase of the pressing-in operation. The control lever locks the driven elbow lever pair in the attained end position during the second phase of the pressing-in operation. Therefore, this invention provides a pressing-in apparatus, which works without a curve or cam control for the non-symmetrical closing movement, yet still permits very high pressure attachment forces while being light in weight.

5 Claims, 17 Drawing Figures

Fig. 3 (III)

APPARATUS FOR PRESSING-IN BELT CONNECTORS

BACKGROUND OF THE INVENTION

The invention relates to an apparatus for pressing-in or pressure attaching belt connectors. Such machines are predominantly used in underground mines and have been known in numerous versions for decades.

For instance, German Patent (DE-PS) No. 1,042,988 shows a pressing-in device for wire hook type connectors. Wire hook type connectors are not sufficient any more for high tensile or high strength conveyor belts. Therefore, in such cases disc or plate type connectors are predominantly used. As a result, devices for pressing-in or pressure attaching conveyor belt connectors as shown, for example, by the Applicant's German Patent (DE-PS) No. 2,545,403 corresponding to part of the disclosure of U.S. Pat. No. 4,050,138 have been developed.

Due to new developments even these devices are not satisfactorily suitable any more for use, particularly in the manufacturing of conveyor belts, because the forces necessary for producing the belt connections could not be achieved by previous machines.

Because of the development of high tensile fibers, it is possible to manufacture very high strength conveyor belts, which require an application of a high force for pressing-in the conveyor belt connectors. With regard to the known types of connectors, which require on the one hand, higher pressing-in forces, and which on the other hand, cannot be sufficiently anchored or attached with the customary clipping, such currently known connectors as well as pressing-in machines exhibit particularly the following disadvantages.

The control of non-symmetrical closing movements by means of curves or cams is susceptible to wear and tear in underground operations in a coal mine, for example. The curves or cams are expensive to manufacture. They permit only limited pressing-in or pressure attachment forces, because the Hertzian compression on the curve limits the load capacity of cam controlled devices. Consequently, cam controlled pressing-in machines for the pressing-in or pressure attachment of heavy duty connectors in hard, high-strength belts, are no longer sufficient.

Furthermore, a close spacing arrangement of the crimp or staple shanks to be pressure attached, is required for these belts, to avoid an overly deep penetration of the connector elements into the conveyor belt. Such avoiding requires a clipping of the staple points. Because of the high pressure attachment forces, the conventional anchoring of the tips by clipping, which was customary up until now, is no longer sufficient. On the other hand, the cutting or clipping of the staple points cannot be avoided, since otherwise a larger number of connector sizes would have to be used for various belt thicknesses.

OBJECTS OF THE INVENTION

Therefore, it is the object of the invention to provide an apparatus for pressing-in belt connectors, the pressing-in or pressure-attachment lever of which is driven by two elbow lever or toggle lever systems, which work without a curve or cam control for the non-symmetrical closing movement. The apparatus shall enable very high pressure attachment forces while being light in weight.

Furthermore, it should be possible in working with the new machine, after reaching the maximum attachment pressure to automatically provide a longer dwell time for the pressure, during which dwell time additional work operations, such as the insertion of the staples, the cutting and bending of the staple points, etc. may be carried out. The drive for these additional tools shall be derived from the same drive lever which also drives the main bell crank lever system.

SUMMARY OF THE INVENTION

The invention's objectives are achieved in an apparatus for pressing-in belt connectors having a pressing-in lever driven by two elbow or toggle lever systems, in that a control lever is positioned between the two elbow or toggle lever systems, namely the driving elbow or toggle lever pair and the driven elbow or toggle lever pair. The control lever is driven by the driving elbow or toggle lever pair during the first phase of a pressing-in operation, and during the second phase of the pressing-in operation the control lever locks the driven elbow or toggle lever pair in the attained final position.

BRIEF FIGURE DESCRIPTION

Further advantages and features of the invention are provided by the following description and the dependent claims.

The invention is depicted purely schematically by way of example in the drawings, wherein:

In FIGS. 11 to 16 the viewing direction is indicated by the arrow IV.

DETAILED DESCRIPTION OF PREFERRED EXAMPLE EMBODIMENTS AND OF THE BEST MODE OF THE INVENTION

Figure 4:
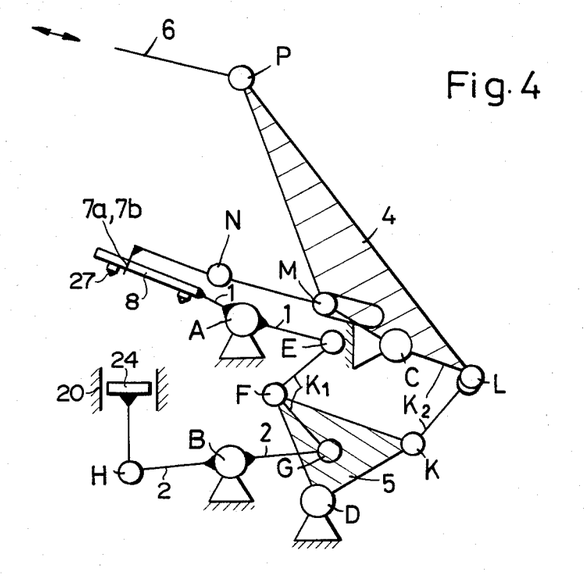
FIG. 4 shows schematically the starting position of the still open tool head substantially as in FIG. 1.

According to FIG. 4, a first elbow or toggle lever pair EFG with the two arms K1 is arranged for cooperation with the upper pressing-in lever 1 supported and journalled at the fulcrum A, and with the lower pressing-in lever 2 supported and journalled at the fulcrum B. This first elbow or toggle lever pair EFG is moved or driven by the control lever 5 and its position is determined by the control lever 5 for operating a tool head 8 driven by the lever 1 and one lower tool member 24 driven by the lever 2. The control lever 5, hatched in the illustrations, is supported and journalled at the fulcrum D. The control lever 5 is driven by a second driving elbow or toggle lever pair CLK by means of the arms K2. Because of this, one elbow lever connecting member CL(K2) of the second driving pair works as a part of or is part of the driving lever 4 (hatched in the drawing).

Figure 1:
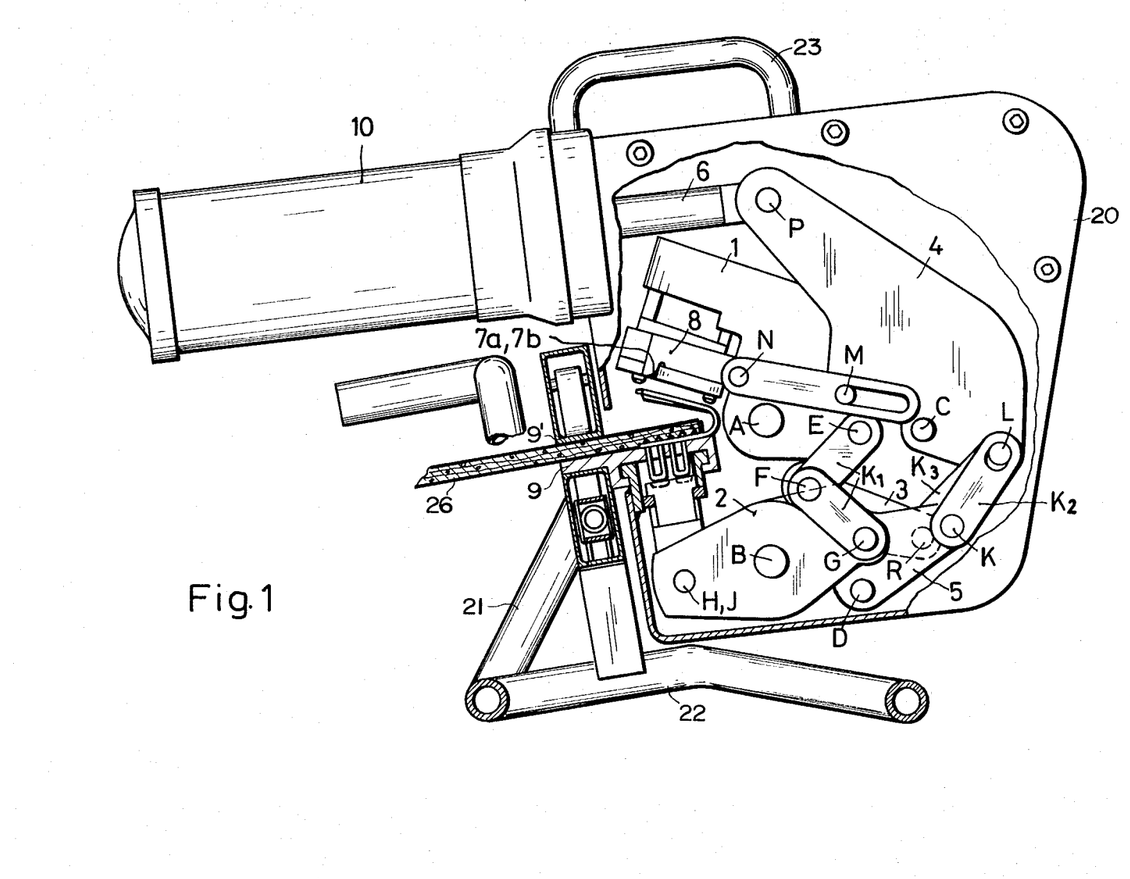
FIG. 1 shows a left side view of the machine, of which the cover is partially broken away, and wherein the driving lever is in the starting position.
Figure 10:
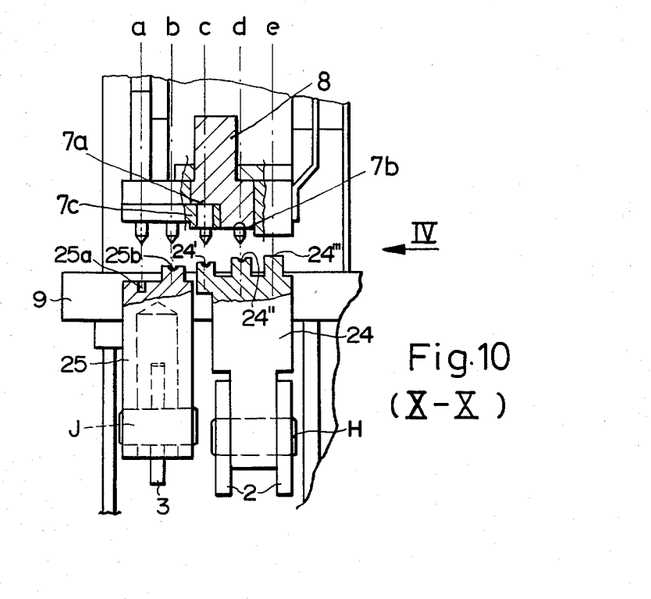
FIG. 10 is a sectional view through the upper tool head and through the first and second lower tool members along section line X—X in FIG. 2 whereby the belt end has been omitted.

As shown in FIG. 1 the apparatus has a housing 20 enclosing and carrying the components including a piston cylinder 10 for driving the tool head 8 and two separate lower tool members 24 and 25 best seen in FIG. 10. The housing 20 is mounted on frame members 21, 22 and has a handle 23. A support 9 for holding a belt end 26 is mounted in the housing 20 and cooperates with a belt end clamp 9' for holding a belt end 26 during the attaching of a belt end connector 11 to 16. The tool head 8 is provided with pins 27 for holding a belt end connector 11 to 16 in place during its connection to the belt end 26. The piston cylinder 10 has a piston rod 6 pivoted to the above mentioned driving lever 4.

Figure 5:
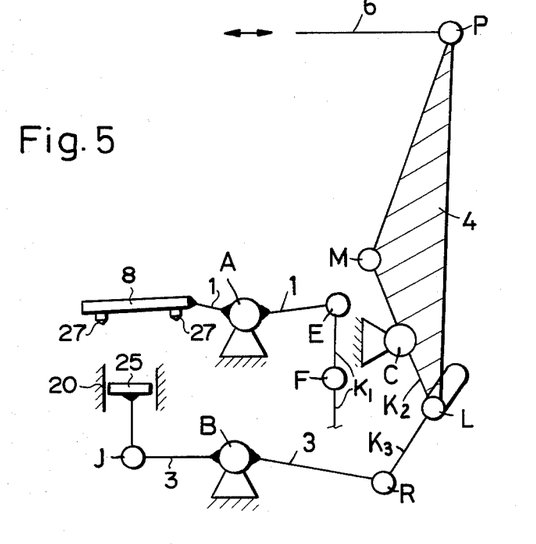
FIG. 5 shows schematically the tool head in a substantially closed position as in FIG. 2.

FIG. 5 shows the movement of the pushing-in lever 3 for driving the other lower tool member 25 for pushing in a staple 17. This lever 3 is supported and journalled together with lever 2 by the axle or shaft B. The elbow or toggle lever CLR (K2, K3) provides the drive for the pushing-in lever 3. In other words, the same elbow or toggle lever connecting member CL(K2) which drives the control lever 5 by way of the elbow or toggle lever K2, also drives the pushing-in lever 3 by means of the elbow or toggle lever connecting member K3. Furthermore, the elbow lever connecting member K3 allows an idle stroke of the journal axle L, so that the lever 3 does not move during the closing movement of the elbow or toggle lever system CLK(K2). The pushing-in movement of the lever 3 only begins when the toggle lever CLK(K2) arrives directly in front of its dead center, so that the levers 1 and 2 have reached their end position.

Figure 6:
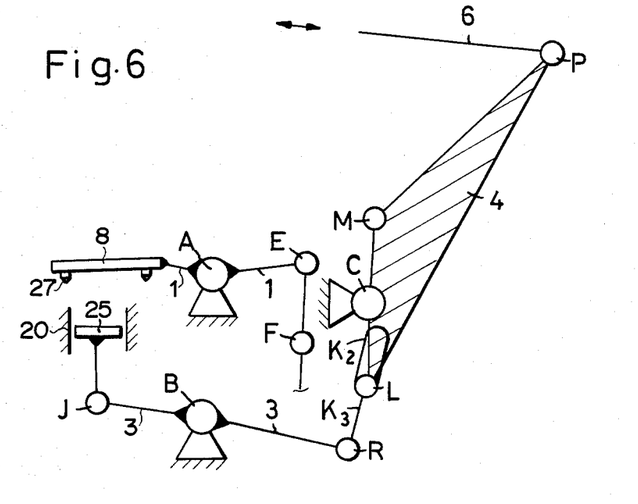
FIG. 6 shows schematically the end position of the pushing-in lever.

FIG. 6 shows the end position of the pushing-in lever 3 and of the elbow lever connecting member CLR(K2, K3).

Figure 7:
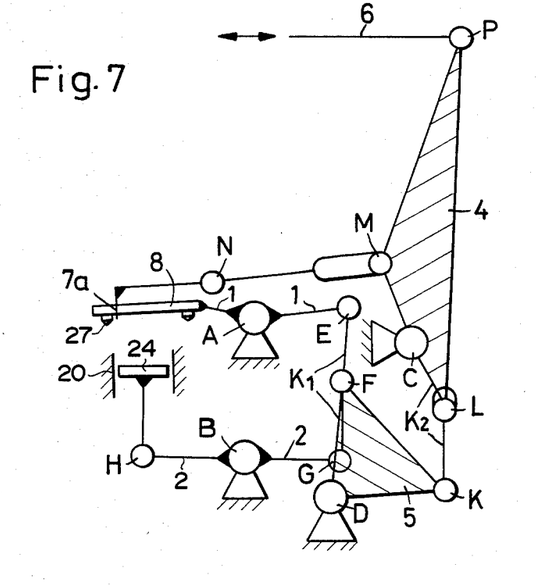
FIG. 7 shows schematically the end position of the first and second pressing-in levers at the beginning of a tool movement for cutting off the staple tips.

FIG. 7 shows the end position of the levers 1 and 2 at the beginning of the cutting-off movement for cutting off staple tips 17' of staples 17 prior to bending staple ends 17". The pulling member MN first only makes a pivoting motion at the beginning of the movement of the drive lever 4 so that it does not move the cutting tool 7a yet. Only when the levers 1 and 2 have reached their end position will the cutting tool 7a be moved by the axle M of the pulling member MN, in a plane parallel to the surface of a connector element 11 to 16.

Figure 8:
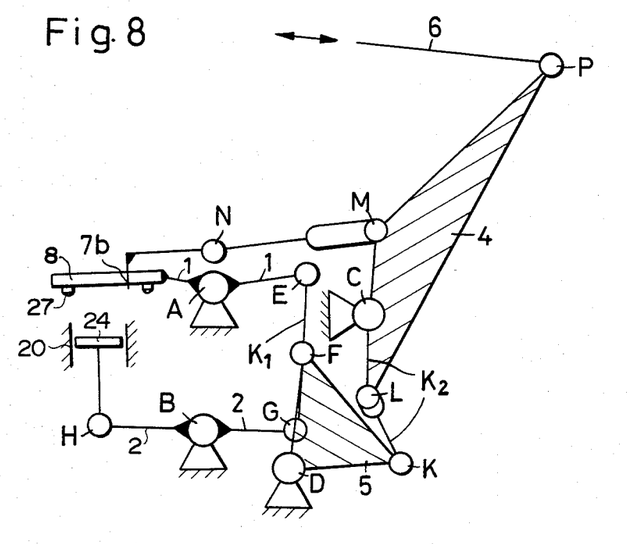
FIG. 8 shows schematically the end position of a bending tool after a movement for bending staple ends.

FIG. 8 shows the end position of the bending tool 7b, which is affixed to the same tool head 8 as the cutting tool 7a.

Figure 9:
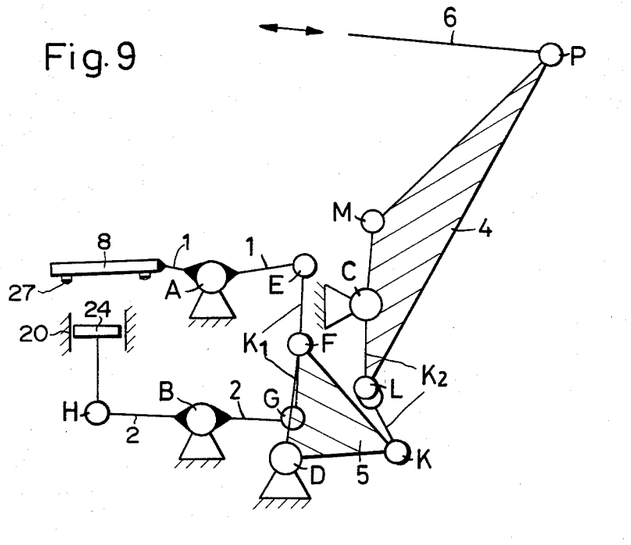
FIG. 9 shows schematically the end position of the first and second pressing-in levers at the completion of a work cycle with the control lever in its resting position.

FIG. 9 shows the end position of the lever system 1, 2. After the elbow or toggle lever CLK(K2) passes its dead center point, an idle stroke of the elbow or toggle lever connecting member LK(K2) allows the control lever 5 to assume its resting position.

Figure 2:
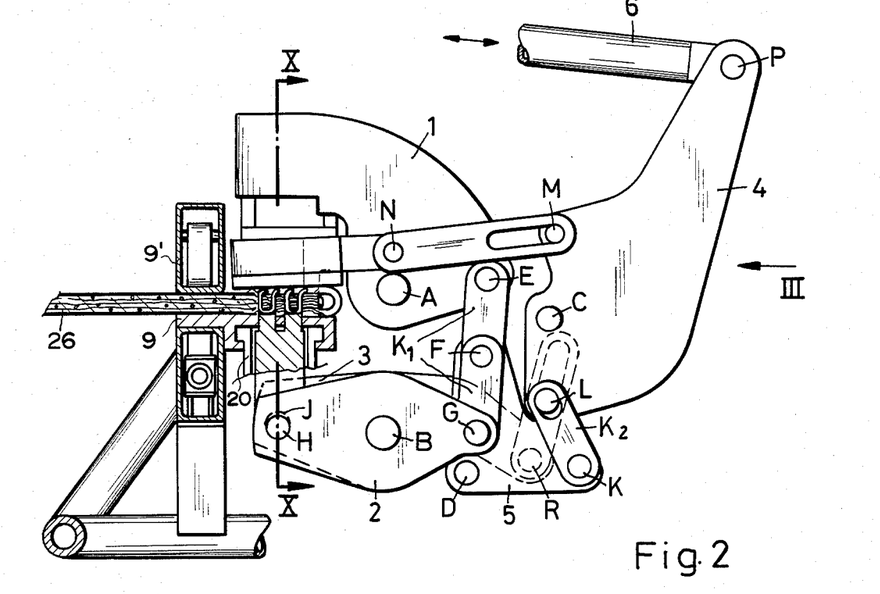
FIG. 2 shows a vertical section in the area of the tools, according to FIG. 1, however, with the driving lever in the end position.
Figure 3:
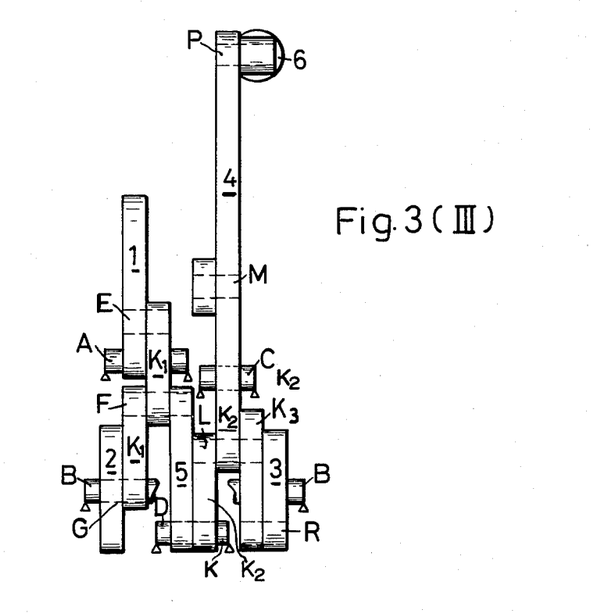
FIG. 3 shows a view of the machine from the right in the direction of the arrow III in FIG. 2 and with the housing removed.

FIG. 10 shows a section along line X—X of FIG. 2, in the area of the upper tool head 8 and the lower tool members 24, 25 on a larger scale.

Figure 11:
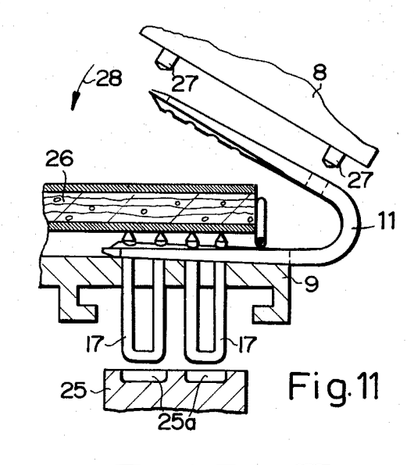
FIG. 11 shows an enlarged scale compared to FIG. 1 a similar side view as in FIG. 1 partially in section and illustrating the upper tool head and one of the two lower tool members in the open starting position with a belt end inserted into a still open connector element.
Figure 12:
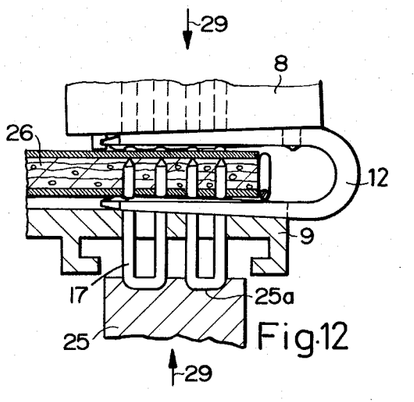
FIG. 12 shows a view similar to that of FIG. 11 along section line "a" in FIG. 10.
Figure 13:
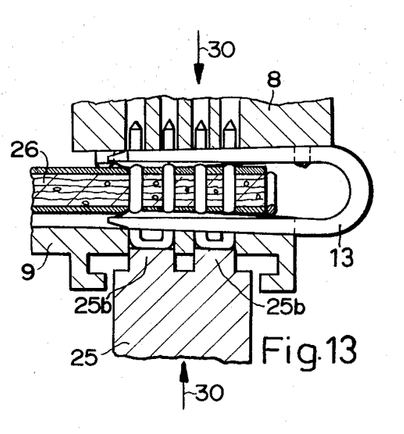
FIG. 13 shows a view similar to that of FIG. 11 along section line "b" in FIG. 10.
Figure 14:
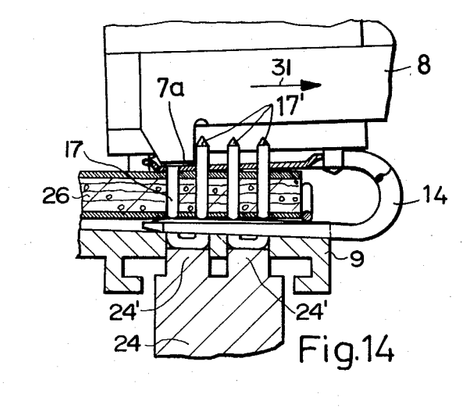
FIGS. 14 and 14a show views similar to that of FIG. 11 along section line "c" in FIG. 10.
Figure 14A:
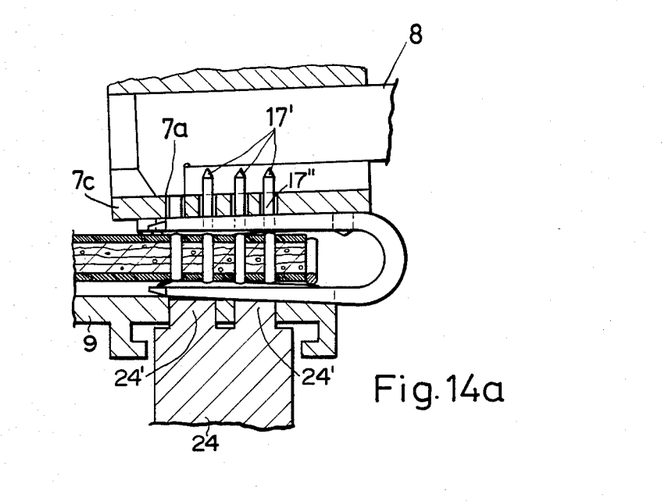
Figure 15:
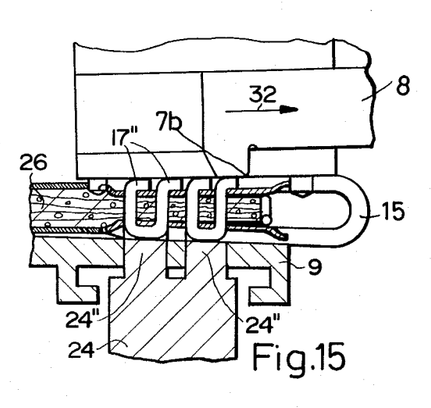
FIG. 15 shows a view similar to that of FIG. 11 along section line "d" in FIG. 10.
Figure 16:
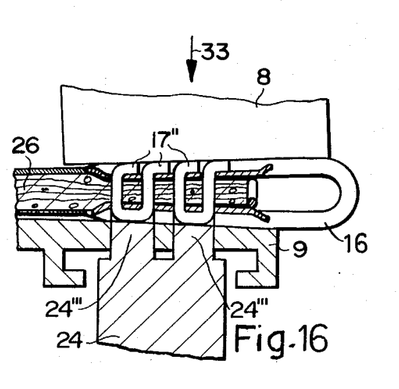
FIG. 16 shows a view similar to that of FIG. 11 along section line "e" in FIG. 10.

The section planes "a" to "e" in FIG. 10 correspond to the representations in FIGS. 12 to 15 seen in the direction of the arrow IV, such that section plane "a" relates to FIG. 12, "b" relates to FIG. 13, "c" relates to FIG. 14 or 14a, "d" relates to FIG. 15, and "e" relates to FIG. 16. The FIGS. 11 to 16 show the spatial arrangement of the tools in the respective working positions.

The operation of the present apparatus will now be described with reference to FIGS. 11 to 16. In chronological order the following sequence of work operations takes place, whereby the apparatus is moved in the direction of the arrow IV shown in FIG. 10 across a belt end 26. The piston rod 6 of the driving compressed air cylinder 10 (FIG. 1) moves or pivots the driving lever 4 about its fixed fulcrum C in the clockwise direction. Due to the simultaneous movement of the pivot point L of the elbow lever connecting member LK(K2) affixed to the lever 4, the control lever 5 which is preferably a bell crank lever as shown in FIG. 4 is rotated about its fixed fulcrum D also in the clockwise direction. Thus, the control lever 5 moves the two elbow levers EF and FG(K1) by means of the hinge or pivot pin F. Hereby, the two pressing-in levers 1 and 2 are closed. Through this motion, the last connector element 16 in the tool plane "e" is pressed-in and completed, as shown in FIG. 16 by the final movement of the tool head 8 indicated by the arrow 33.

Furthermore in the tool plane c the pre-inserted staples 17 shown in FIG. 11 are either brought into the cutting-off position as in FIG. 14, or they are pushed into their end position as shown in FIG. 14a.

In FIG. 15, the connector element 15 is clamped in the tool plane d, so that an exact positioning is possible during the following bending over of the staple legs 17" remaining after the tips 17' of the staples 17 have been cut-off by movement of the tool member 7a in the direction of the arrow 31 in FIG. 14. The bending of the remaining staple legs 17" takes place when the tool member 7b is moved in the direction of the arrow 32 in FIG. 15.

The reference numbers 11 to 16 of the connector elements relate to the sequence from the beginning of the pressing-in operation shown in FIG. 11 to the end thereof shown in FIG. 16.

The clipping of the staple tips can be performed according to FIG. 14, in such a manner that the staples are only partly pressed-in at first and then the cutting is done by the cutting tool 7a without any counter tool, or as in FIG. 14a in which the staples 17 are fully pressed-in and the bending length of the staple legs 17" and thus of the staple tips 17' to be cut off can be adjusted by the insertion of a respectively perforated plate 7c (FIG.

14a). The thickness of this plate 7c determines the length of the staple legs 17" to be sent and thus also the length of the protruding staple tips 17' to be cut off.

In FIG. 11 the tool head 8 pivots counterclockwise in response to the drive by the lever 1 as indicated by the arrow 28 whereby locating pins 27 of the tool head 8 engage in respective holes in the connector element 11 for locating the connector element as it is being bent around a belt end 26. The staples 17 inserted in the connector element 11 are about to be engaged by recesses 25a in the lower tool member 25 which pushes the staples 17 first partially through the belt end 26 under the forces 29 as shown in FIG. 12. In FIG. 13 the pushing-in continues with the tool elements 25b of the tool member 25 under the forces 30 as shown in FIG. 13. In FIGS. 14, 14a the tool elements 24' of the lower tool member 24 take over and complete the pressing-in of the staples 17. FIGS. 14, 14a show the cutting of the tips 17' in progress. The first tip, from left to right, has already been cut and the remaining three tips 17' are about to be cut by the continued rightward movement of the tool member 7a in the tool head 8 as indicated by the arrow 31 in FIG. 14. In FIG. 15 the tool elements 24" continue the pressing-in while the bending of the staple legs 17" is substantially completed. In FIG. 16 a final compression is applied as shown by the arrow 33 while the tool elements 24''' of the lower tool member 24 are effective.

Although the invention has been described with reference to specific example embodiments, it will be appreciated, that it is intended to cover all modifications and equivalents within the scope of the appended claims.

I claim:

1. An apparatus for securing belt connectors with staples to an end of a belt, comprising support means, belt end holding means mounted to said support means for holding a belt end in place during the securing of the belt connectors to the belt end, upper tool means (8) for providing a counter force, first lever means (1) journalled to a first fixed point (A) in said support means and connected to said upper tool means for operating said upper tool means, lower tool means arranged for cooperation with said upper tool means, second lever means (2) journalled to a second fixed point (B) in said support means and connected to said lower tool means (24), drive means (6,4) including a drive lever (4) journalled to a third fixed point (C) in said support means for driving said upper and lower tool means, first driven toggle lever means (K1) including a first movable toggle joint (F) and operatively interconnecting said first and second lever means (1, 2), a control lever (5) journalled to a fourth fixed point (D) in said support means, second driving toggle lever means (K2) including a second toggle joint (L) movable with said drive lever (4) and pivotally connected (at K) to said control lever (5), said control lever (5) also being pivotally connected to said first movable toggle joint (F) for operating said upper tool means in advance of operating said lower tool means to provide a non-symmetrical closing movement of said upper tool means relative to said lower tool means and for locking said driven toggle lever means (K1) into a fixed position when said drive lever (4) has reached a certain position to permit further operation of said drive lever (4) without driving said first and second lever means.

2. The apparatus of claim 1, wherein said control lever (5) is a bell-crank lever having a fixed pivot journalled to said fourth fixed point (D), a first arm journalled to said first toggle joint (F) and a second arm journalled to said second driving toggle lever means (K2).

3. The apparatus of claim 1, wherein said lower tool means comprise two separately movable tool members (24, 25), one of said lower tool members (24) being operatively connected to said second lever means (2), third lever means (3) journalled to a fifth fixed point in said support means and operatively connected to the other of said lower tool members for driving said other lower tool member, and third driving toggle lever means (K3) having a third toggle joint coinciding with said second toggle joint (L) movable with said drive lever (4) and pivotally connected (at R) to said third lever means (3) for driving said other lower tool member (25).

4. The apparatus of claim 3, wherein said fifth fixed point coincides with said second fixed point (B).

5. The apparatus of claim 1, wherein said upper tool means comprise a perforated plate (7c) having apertures therein through which staple ends extend, said plate having a given thickness for determining the length of staple legs (17") to be bent over and thus the length of staple tips (17') to be cut off.

* * * * *